(12) United States Patent
Walsh et al.

(10) Patent No.: US 9,251,013 B1
(45) Date of Patent: Feb. 2, 2016

(54) SOCIAL LOG FILE COLLABORATION AND ANNOTATION

(71) Applicants: Sean Walsh, Redwood City, CA (US); Brian Wheeler, Cherry Hills, CO (US); Jeremy Leng, Folsom, CA (US)

(72) Inventors: Sean Walsh, Redwood City, CA (US); Brian Wheeler, Cherry Hills, CO (US); Jeremy Leng, Folsom, CA (US)

(73) Assignee: BERTRAM CAPITAL MANAGEMENT, LLC, San Mateo, CA (US)

( * ) Notice: Subject to any disclaimer, the term of this patent is extended or adjusted under 35 U.S.C. 154(b) by 0 days.

(21) Appl. No.: 14/501,148

(22) Filed: Sep. 30, 2014

(51) Int. Cl.
 *G06F 17/30* (2006.01)
 *G06F 11/14* (2006.01)
 *G06F 11/07* (2006.01)

(52) U.S. Cl.
 CPC ........ *G06F 11/1471* (2013.01); *G06F 11/0766* (2013.01); *G06F 17/3053* (2013.01); *G06F 17/3087* (2013.01); *G06F 17/30867* (2013.01); *G06F 2201/84* (2013.01)

(58) Field of Classification Search
 None
 See application file for complete search history.

(56) References Cited

U.S. PATENT DOCUMENTS

| | | | |
|---|---|---|---|
| 5,392,428 A | 2/1995 | Robins | |
| 5,416,903 A | 5/1995 | Malcolm | |
| 5,721,827 A | 2/1998 | Logan et al. | |
| 6,071,317 A | 6/2000 | Nagel | |
| 6,275,223 B1 | 8/2001 | Hughes | |
| 6,418,543 B1 | 7/2002 | Goli et al. | |
| 6,470,383 B1 | 10/2002 | Leshem et al. | |
| 6,549,944 B1 | 4/2003 | Weinberg et al. | |
| 6,571,285 B1 | 5/2003 | Groath et al. | |
| 6,701,514 B1 * | 3/2004 | Haswell et al. | 717/115 |
| 6,985,901 B1 | 1/2006 | Sachse et al. | |
| 6,996,843 B1 | 2/2006 | Moran | |
| 7,085,936 B1 | 8/2006 | Moran | |
| 7,089,278 B1 | 8/2006 | Churchill et al. | |
| 7,165,041 B1 | 1/2007 | Guheen et al. | |
| 7,167,898 B2 | 1/2007 | Sato et al. | |
| 7,191,364 B2 | 3/2007 | Hudson et al. | |
| 7,207,065 B2 | 4/2007 | Chess et al. | |
| 7,231,633 B2 | 6/2007 | Grassens | |
| 7,376,937 B1 | 5/2008 | Srivastava et al. | |
| 7,424,718 B2 | 9/2008 | Dutton | |
| 7,512,954 B2 | 3/2009 | Srivastava et al. | |
| 7,542,985 B1 | 6/2009 | Compton et al. | |
| 7,657,872 B2 | 2/2010 | Kelbaugh et al. | |
| 7,779,097 B2 | 8/2010 | Lamkin et al. | |
| 7,856,446 B2 | 12/2010 | Brave et al. | |
| 7,904,515 B2 | 3/2011 | Ambati et al. | |
| 8,015,194 B2 | 9/2011 | Wolff et al. | |

(Continued)

FOREIGN PATENT DOCUMENTS

| | | |
|---|---|---|
| WO | 0073957 A2 | 12/2000 |
| WO | 2009052618 A1 | 4/2009 |
| WO | 2013098543 A1 | 7/2013 |

*Primary Examiner* — Hung Q Pham
(74) *Attorney, Agent, or Firm* — Raj Abhyanker, P.C.

(57) ABSTRACT

A system, method, and apparatus of social log file collaboration and annotation is disclosed. In one embodiment, a method identifies a log file of importance, centralizes storage of the log file of importance and generates a social profile of the log file of importance. The method sets an access privilege associated with a user accessing the social profile of the log file of importance and permits the access the social profile of the log file of importance. The method processes a comment and/or an annotation in the social profile of the log file of importance of the user accessing the social profile of the log file of importance using a processor and a memory.

18 Claims, 6 Drawing Sheets

(56) References Cited

U.S. PATENT DOCUMENTS

| | | |
|---|---|---|
| 8,073,861 B2 | 12/2011 | Cundiff et al. |
| 8,095,537 B2 | 1/2012 | Wolff et al. |
| 8,218,764 B1 | 7/2012 | Kline |
| 8,271,563 B1 | 9/2012 | Lee |
| 8,484,292 B2 | 7/2013 | Spataro et al. |
| 8,516,399 B2 | 8/2013 | Paris et al. |
| 8,527,954 B2 | 9/2013 | Benameur et al. |
| 8,561,205 B2 | 10/2013 | McCurdy et al. |
| 8,601,023 B2 | 12/2013 | Brave et al. |
| 8,645,991 B2 | 2/2014 | McIntire et al. |
| 8,706,735 B2 | 4/2014 | Morton et al. |
| 8,707,246 B2 | 4/2014 | Chen et al. |
| 8,713,106 B2 | 4/2014 | Spataro et al. |
| 8,713,693 B2 | 4/2014 | Shanabrook et al. |
| 8,719,071 B2 | 5/2014 | MacIntyre et al. |
| 8,769,440 B2 | 7/2014 | Hoyle |
| 8,769,491 B1 | 7/2014 | Conti et al. |
| 2003/0142122 A1 | 7/2003 | Straut et al. |
| 2004/0186817 A1 | 9/2004 | Thames et al. |
| 2004/0225716 A1 | 11/2004 | Shamir et al. |
| 2005/0182655 A1 | 8/2005 | Merzlak et al. |
| 2006/0053194 A1 | 3/2006 | Schneider et al. |
| 2006/0161578 A1* | 7/2006 | Siegel et al. .................. 707/102 |
| 2007/0143366 A1 | 6/2007 | D'Souza et al. |
| 2007/0233692 A1* | 10/2007 | Lisa et al. ....................... 707/10 |
| 2008/0120564 A1* | 5/2008 | Balasubramanian et al. 715/771 |
| 2009/0193345 A1 | 7/2009 | Wensley et al. |
| 2011/0184960 A1 | 7/2011 | Delpha et al. |
| 2012/0304095 A1 | 11/2012 | Dennis |
| 2013/0159507 A1 | 6/2013 | Mason et al. |
| 2013/0159826 A1 | 6/2013 | Mason et al. |
| 2014/0019843 A1 | 1/2014 | Schmidt |
| 2014/0047356 A1 | 2/2014 | Ameller-Van-Baumberghen et al. |
| 2014/0101527 A1 | 4/2014 | Suciu |
| 2014/0109051 A1 | 4/2014 | McDonald et al. |
| 2014/0115439 A1 | 4/2014 | Delpha et al. |

* cited by examiner

SOCIAL LOG FILE COLLABORATION AND ANNOTATION

FIELD OF TECHNOLOGY

This disclosure relates generally to the technical fields of software and, more particularly, to a method, apparatus, and system of social log file collaboration and annotation.

BACKGROUND

A software developer may need to test and debug a software code that they create. The software code may be associated with a mobile application, an enterprise software application, a desktop application, a client/server application and/or a web based application. Sometimes, the software developer may work in a team of programmers that are working on the same software code simultaneously, and/or which have worked on similar software code in the past.

The software developer may utilize a log file to determine a set of activities (e.g., error conditions) associated with an operation of a software code. Productivity of the software developer may be compromised spending time finding error conditions that have been resolved by other developers in the past. In addition, the software developer may not know which other developer with knowledge to ask for advice. As a consequence, the software developer may need to repeat work done by others. Repeating work done by others in analyzing the log file may be cumbersome, expensive, and/or inefficient.

SUMMARY

Disclosed are a method, a device and/or a system of social log file collaboration and annotation, according to one embodiment.

In one aspect, a method identifies a log file of importance, centralizes storage of the log file of importance and generates a social profile of the log file of importance. The method sets an access privilege associated with a user accessing the social profile of the log file of importance and permits the access the social profile of the log file of importance. The method processes a comment and/or an annotation in the social profile of the log file of importance of the user accessing the social profile of the log file of importance using a processor and a memory.

The method may assign a tag to the social profile, the log file of importance, and/or a portion of the log file of importance. The tag may be placed by the user. The tag is a term that may attach to the social profile, the log file of importance, and/or the portion of the log file of importance as meta-data to enable a faster relevant search based on the term that attaches to the social profile, the log file of importance, and/or the portion of the log file of importance.

The method may determine other users to contribute another comment and/or another annotation to the social profile of the log file of importance and may provide an update to the user when the other users contribute another comment and/or another annotation to the social profile when other users contribute comments to the log file of importance.

The method may permit annotation of information in the social profile and may determine the log file of importance associated with a debug condition that has been resolved. The method may close future comments to the log file of importance when the debug condition is resolved.

The method may curate the log file of importance such that the log file is identified from a larger set of potential log files across a wider world wide web. The method may be operated in a log collaboration server that may permit collaboration and/or annotation of the log file of importance by users of the log collaboration server. The log collaboration server may increase intelligence based on automatic correlation of related log files of importance, revision history, and/or semantic analysis of annotations to each log file of importance managed by the log collaboration server.

The log collaboration server may provide a social troubleshooting of error conditions, real-time visibility of error conditions, proactive monitoring and/or alerts of error conditions, search of error conditions, investigation of error conditions, event filtering of error conditions, and/or prioritization of error conditions. The method may determine a set of access privileges associated with users to access the social profile of the log file of importance, such that the set of access privileges determine who can annotate, comment, and/or view the log file of importance. The method may permit the user to flag the annotation in the social profile of the log file of importance of the user accessing the social profile of the log file of importance.

The method may permit the user to break out the log file of importance into separate pages of the social profile and may assign meta-tags to the log file of importance to simplify the queries to the log file of importance.

The method may aggregate the log file of importance from third party systems which include a project management system, a source repository, and/or a distributed internet system to be centralized for management. The method may create workflow management of each log files of importance and may permit the user to place a vote on beneficial annotations in the log file of importance. Also, the method may rank the annotations based on the vote and other votes of other users.

The method may designate an administrator to manage the log file of importance. The method may permit the user to right-click an item to permit a search on a broader internet to permit search on a stack overflow website, and/or on a general purpose search engine website and may display a search result in a pop-up menu search result.

The productivity of a software developer may be enhanced when managing logs and/or debugging error conditions through the annotation of the social profile of the log file of importance.

In another aspect, a method includes identifies a log file of importance, centralizes a storage of the log file of importance and generates a social profile of the log file of importance. The method sets an access privilege associated with a user accessing the social profile of the log file of importance. The method also permits the access the social profile of the log file of importance and processes a comment and/or an annotation in the social profile of the log file of importance of the user accessing the social profile of the log file of importance using a processor and a memory. The method assigns a tag to the social profile, the log file of importance, and/or a portion of the log file of importance. The tag is placed by the user and the tag is a term that attaches to the social profile, the log file of importance, and/or the portion of the log file of importance as meta-data to enable a faster relevant search based on the term that attaches to the social profile, the log file of importance, and/or the portion of the log file of importance.

In yet another aspect, a log collaboration server includes a processor and a memory when executed because a computer server identifies a log file of importance. The server centralizes storage of the log file of importance and generates a social profile of the log file of importance. The server set an access privilege associated with a user accessing the social profile of the log file of importance and permits the access the social profile of the log file of importance. The server processes a comment and/or an annotation in the social profile of the log file of importance of the user accessing the social profile of the log file of importance.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, apparatus, and system of social log file collaboration and annotation are disclosed. In the following description, for the purposes of explanation, numerous specific details are set forth in order to provide a thorough understanding of the various embodiments. It will be evident, however, to one skilled in the art that the various embodiments may be practiced without these specific details.

Figure 1:
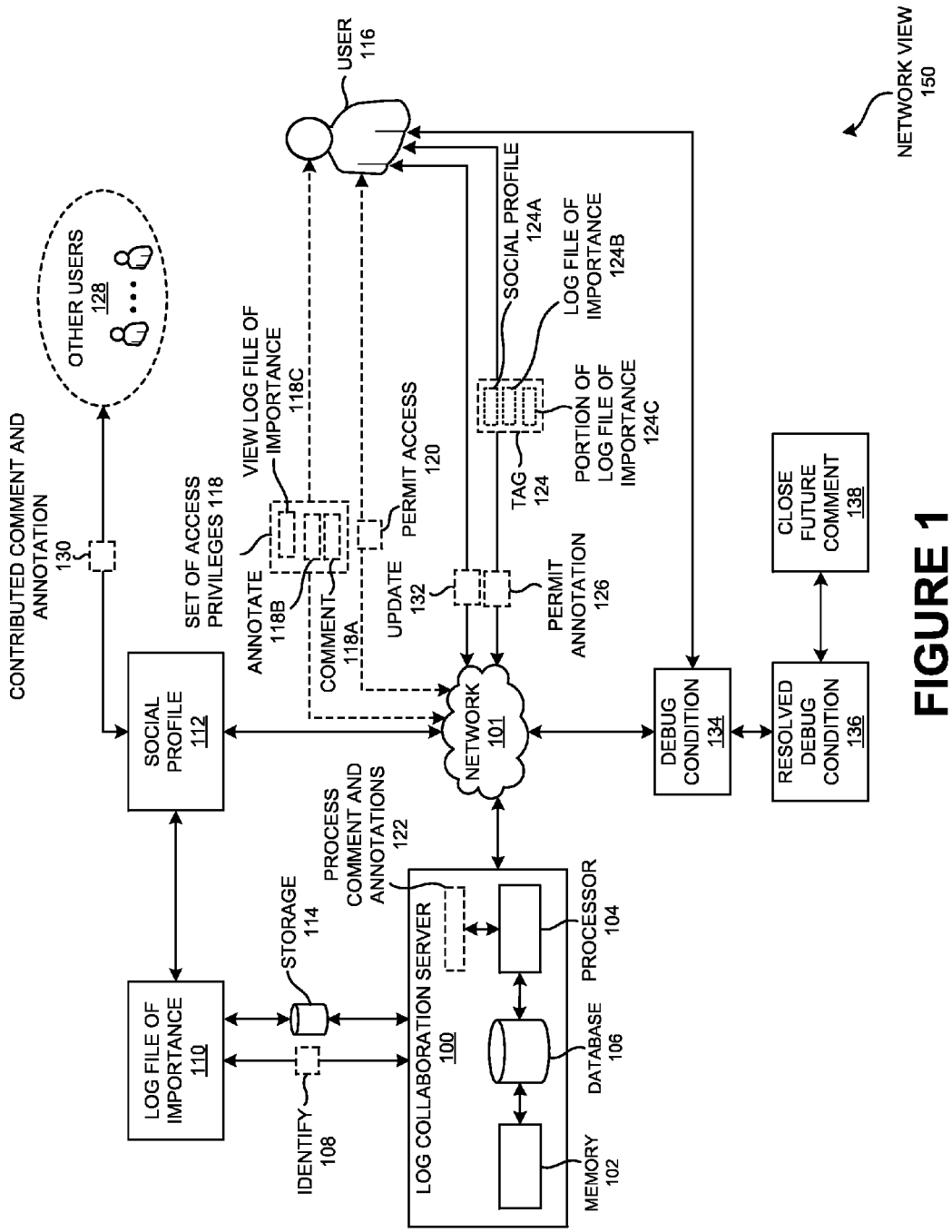
FIG. 1 is a network view of a log collaboration server showing generation of a social profile of a log file of importance, setting an access privilege associated with a user accessing the social profile, permitting the user to access and tag the social profile and processing a comment or annotation in the social profile, determining if the log file of importance is associated with the debug condition and closing the future comments when debug condition is resolved, according to one embodiment.

FIG. 1 is a network view 150 of a log collaboration server 100, a network 101, a memory 102, a processor 104, a database 106, a identify 108, a log file of importance 110, a social profile 112, a storage 114, a user 116, a set of access privileges 118, a comment 118A, an annotate 118B, a view log file of importance 118C, a permit access 120, a process comment and annotations 122, a tag 124, a social profile 124A, a log file of importance 124B, a portion of log file of importance 124C, a permit annotation 126, a other users 128, a contributed comment and annotation 130, a update 132, a debug condition 134, a resolved debug condition 136, a close future comment 138.

The log collaboration server 100 may be a computing system (e.g. a laptop, a desktop, a mobile device) and/or a computer program that manages access to a centralized resource or service in a network 101. The network 101 may be a telecommunications network that allows computers to exchange data. The memory 102 may be physical devices used to store programs (sequences of instructions) and/or data (e.g. program state information) on a temporary and/or permanent basis for sue in a computer or other digital electronic device.

The processor 104 may be a central processor unit (CPC) that may carry out the instructions of a computer program by performing the basic arithmetical, logical, and/or input/output operations of a computing system. The database 106 may be an organized collection of data. The identify 108 may be a sequence of characters (e.g. alphanumeric, numeric, alpha only, etc.) used to refer to a program or an element, such as a variable or a set of data. The log file of importance 110 may be a collection of data that records either the events which happen while an operating system (e.g. software that supports a computer's basic functions) or other software runs, within it, associated with its noteworthiness. The social profile 112 may be a description of an individual's social characteristics that identify them. The storage 114 may be the retention of retrievable data on a computer and/or other electronic system. The user 116 may be a person who uses and/or operates something. The set of access privileges 118 may be a set of special rights granted and/or available only to a particular person or group of people, within it, associated with obtaining and/or retrieving data. The comment 118A may be a verbal and/or written remark expressing an opinion and/or reaction. The annotate 118B may be an additional explanation and/or notation. The view log file of importance 118C may be the ability to access a collection of data that records either the events which happen while an operating system (e.g. software that supports a computer's basic functions) or other software runs, within it, associated with its noteworthiness.

The permit access 120 may be authorization to obtain, examine, and/or retrieve data. The process comment and annotations 122 may be a series of actions and/or operations taken in order to achieve a particular end, pertaining to the remarks and/or notations. The tag 124 may be a label attached to something for the purpose of identification and/or to give other information. The social profile 124A may be a description of an individual's social characteristics that identify them. The log file of importance 124B may be a collection of data that records either the events which happen while an operating system (e.g. software that supports a computer's basic functions) or other software runs, within it, associated with its noteworthiness. The portion of log file of importance 124C may be a part of a whole of the log file of importance.

The permit annotation 126 may be authorization to give additional explanation and/or notation. The other users 128 may be a plurality of users other than the original user. The contributed comment and annotation 130 may be the final and/or used version of verbal and/or written remark, explanation, and/or notation. The update 132 may be an action to record the latest information and/or version of something. The debug condition 134 may be an error in computing and/or programming. The resolved debug condition 136 may be a fixed error in computing and/or programming. The close future comment 138 may be an option to tie off further comments upon resolution.

FIG. 1 is a network view 150 of a log collaboration server 100 showing generation of the social profile 112 of the log file of importance 110. The log collaboration server 100 may be communicatively coupled with the log file of importance 110, the social profile 112, the storage 114, the user 116 through the network 101. The log collaboration server 100 may include a memory 102 communicatively coupled with a processor 104 as well as the database 106, as illustrated in FIG. 1. The log collaboration server 100 may be communicatively coupled with the storage 114.

The user may be communicatively granted the set of access privileges as well as the ability to comment, annotate, and/or view the social profile 112 of the log file of importance 110 and permitted to access the log file of importance 110. The log collaboration server 100 may then process comment and/or annotations made by the user 116 and/or other users 128. The user 116 may create and/or assign the tag which may include the social profile 124A, the portion of log file of importance 124C and/or the log file of importance 110, which may then permit annotation and made available to the other users 128.

The user may then update the social profile 112 of the log file of importance 110 through the network 101, and other contributed comment and annotation from other users, which may be used to address the debug condition, hopefully resolved the debug condition and close future comment upon resolution.

Figure 2:
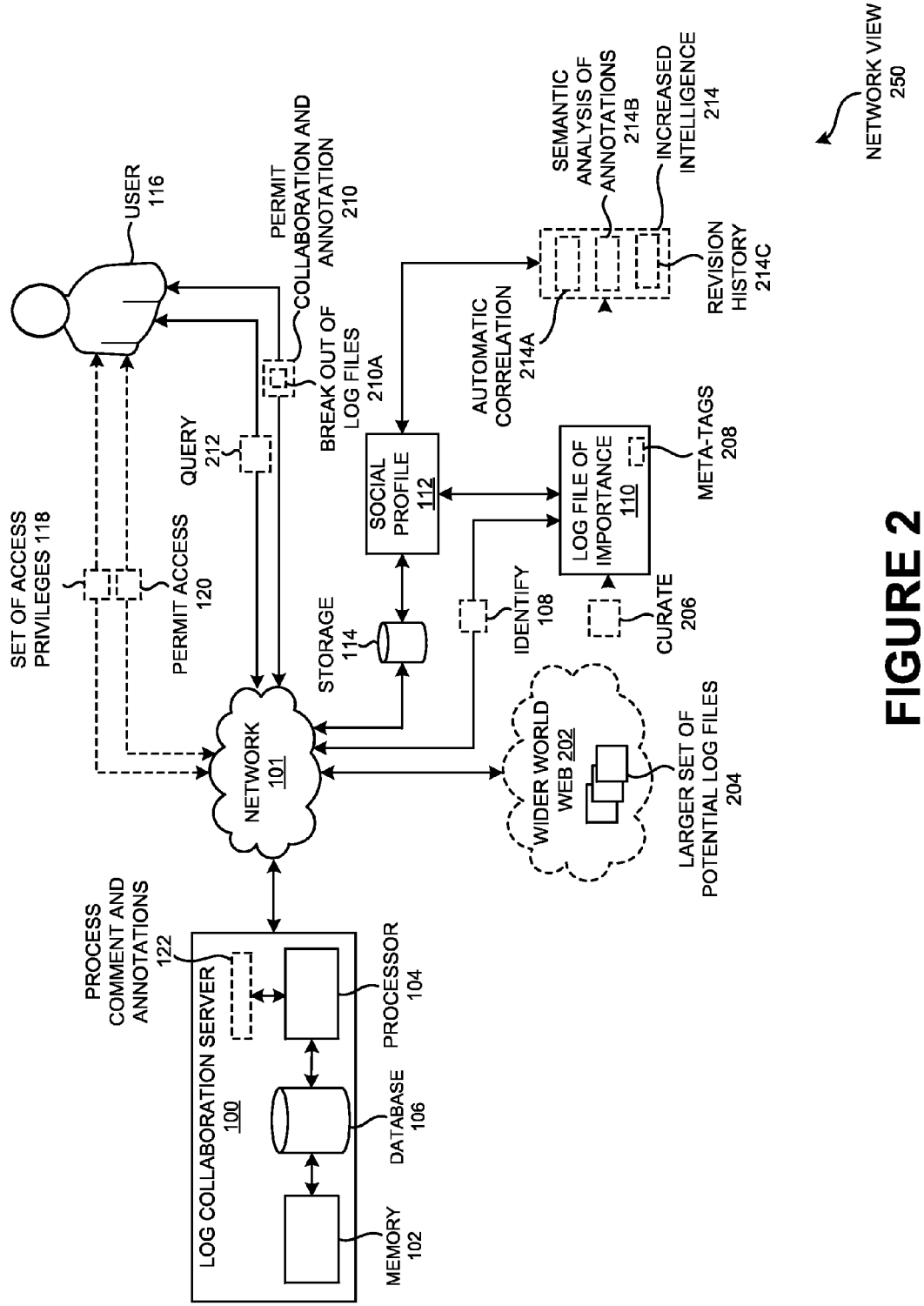
FIG. 2 is network view of the log collaboration server of FIG. 1 showing curation of log file of importance identified from a larger set of potential log files across a wider world wide web, permitting collaboration and annotation of the log file of importance by the users of log collaboration server resulting into increased intelligence, according to one embodiment.

FIG. 2 is a network view 250 of log collaboration server 100, a wider world web 202, a larger set of potential log files 204, a curate 206, a meta-tags 208, a permit collaboration and annotation 210, a break out of log files 210A, a query 212, a increased intelligence 214, a automatic correlation 214A, a semantic analysis of annotations 214B, and/or a revision history 214C.

The wider world web 202 may be a global system (e.g. the Internet) of interconnected computing networks and/or devices (e.g. a laptop, a desktop, a mobile device). The larger set of potential log files 204 may be a broader set of a collection of data that record either the events which happen while an operating system (e.g. software that supports a computer's basic functions) or other software runs. The curate function 206 may be used to select, organized, and/or look after items. The meta-tags 208 may be pieces in an algorithm (e.g. a process, a set of rules, etc.) that are used to define and/or assign relevancy of items searched for.

The permit collaboration and annotation function 210 may govern as to when remarks, explanations, and/or notations are allowed to commence. The break out of log files function 210A may define when a collection of data that record either the event which happen while an operating system (e.g. software that supports a computer's basic functions) or other software runs are allowed to be examined. The query function 212 may be a request asked by the user 116. The increased intelligence function 214 may provide expansion in size and/or amount of understanding, knowledge, comprehension automatically to the social profile 112. The automatic correlation function 214A may result in a self-activating association between two or more things. The semantic analysis of annotations function 214B may generate a logical examination of additional explanations and/or notations. The revision history function 214C may provide a chronological record of previous corrections, alterations, modifications, etc. made.

FIG. 2 is an exploded network view of the log collaboration server 100 showing curation of the log file of importance 110 through the network 101. Particularly, this view illustrates the use of the wider world web 202 to provide the user 116 access to the larger set of potential log files which the wider world web 202 may contain through the network 101. In one embodiment a method may curate the larger set of potential log files into the log file of importance 110, which may then be assigned meta-tags to identify characteristics of that log file of importance 110.

The log file of importance 110 may then be, upon meta-tag identification, assigned the social profile, 112 transferred through the storage 114 and the network 101 to the user 116. Permit collaboration and annotation function 210 may then occur by break out of log files to the user through the network 101. In another embodiment the user 116 may issue a query through the network 101 to the log collaboration server 100 in search of a log file of importance 110 to work on. In one embodiment the log collaboration server 100 may process a plurality of log file of importance taken from the wider world web 202 and worked on by other users 128, analyze the social profile and increase intelligence based on automatic correlation, semantic analysis of annotations and/or revision history.

Figure 3:
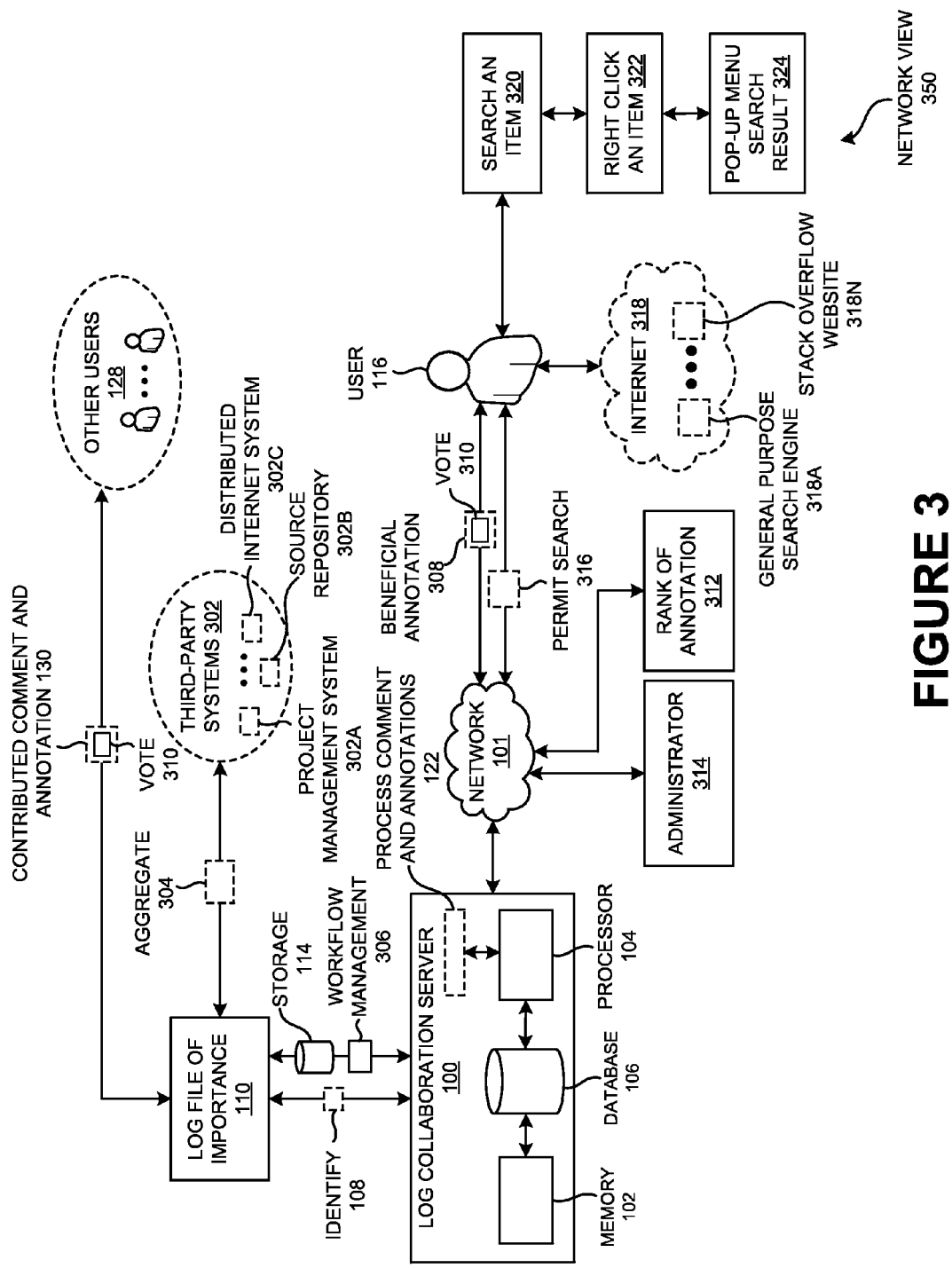
FIG. 3 is a network view of the log collaboration server of FIG. 1 showing ranking of annotation and permitting search of an item in the social profile of the log file of importance aggregated from the third-party system and displaying the search result to the user, according to one embodiment.

FIG. 3 is a network view 350 of log collaboration server 100, a third-party systems 302, a project management system 302A, a source repository 302B, a distributed internet system 302C, a aggregate function 304, a workflow management function 306, a beneficial annotation function 308, a vote function 310, a rank of annotation function 312, a administrator 314, a permit search function 316, a internet 318, a general purpose search engine 318A, a stack overflow website 318B, a search an item function 320, a right click an item function 322, and a pop-up menu search result function 324.

The third-party systems 302 may be an external entity (e.g. person, group of persons, organization, etc.). The project management system 302A may be an application and/or process to oversee administration of a plurality of goals. The source repository 302B may be a storage space for computer code (e.g. instructions). The distributed internet system 302C may be a plurality of online networks that allow sharing and/or allocation of metadata.

The aggregate function 304 may permit the combination of data to make a whole. The workflow management function 306 may be a process in which a project is overseen from initiation to completion. The beneficial annotation function 308 may generate remarks and/or notations given towards helping a particular goal or goals. The vote function 310 may be a formal indication of preference given by the user or users. The rank of annotation function 312 may provide a particular position and/or level in a hierarchy given to remarks and/or notations. The administrator 314 may be a person and/or persons responsible for overseeing a process and/or activity.

The permit search function 316 may grant an ability to inquire after information. The internet 318 may be a global system of interconnected computer networks. The general purpose search engine 318A may be a program with extensive parameters that looks for and identifies items in a database (e.g. the Internet) that correspond to keywords or characters (e.g. alphanumeric, alpha, numeric only, etc.) specified by the user. The stack overflow website 318B may be a location communicatively coupled to the Internet that maintains one or more pages on the World Wide Web pertaining to error conditions that result from attempting to push more items onto a stack (e.g. a collection) than space has been allocated for, which may potentially cause errors and/or bugs. The search an item 320 may be the ability to inquire after a piece or pieces of information by inputting keywords or characters (e.g. alphanumeric, alpha, numeric only, etc.) into a search engine (e.g. a program). The right click an item function 322 may process the selection of an item in a graphical user interface (e.g. a computer screen) by pressing the right-hand button of a mouse. The pop-up menu search result function 324 may be a list of commands and/or options that appears in a graphical user interface (e.g. a computer screen) upon user interaction.

FIG. 3 is a further exploded network view of the log collaboration server 100 showing ranking of annotation and permitting search of an item in the social profile of a log file of importance from the third party systems and displaying the search result to the user. In one embodiment the third party systems, which may include the project management system communicatively coupled with the source repository, and the distributed internet system may aggregate the log file of importance and create workflow management for the log collaboration server 100 to process.

This workflow management function may then help the user 110 and/or other users 126 provide beneficial annotation on the log file of importance, as well as provide the opportunity to vote on importance of said annotations, all through the network 1-1. The rank of annotation function may then be communicated and added to the log file of importance 110 through the log collaboration server 100 and network 101 for the benefit of the other users 126. The administrator may be utilized to oversee management of the log file of importance through the network and log collaboration server 100.

In one embodiment use of the internet may be exercised by the user by right-clicking an item to permit search in the general purpose search engine for any particular stack overflow website that contains other error conditions possibly pertaining and helpful to the log file of importance the user is working on. A pop-up menu search result may then appear displaying the results.

Figure 4:
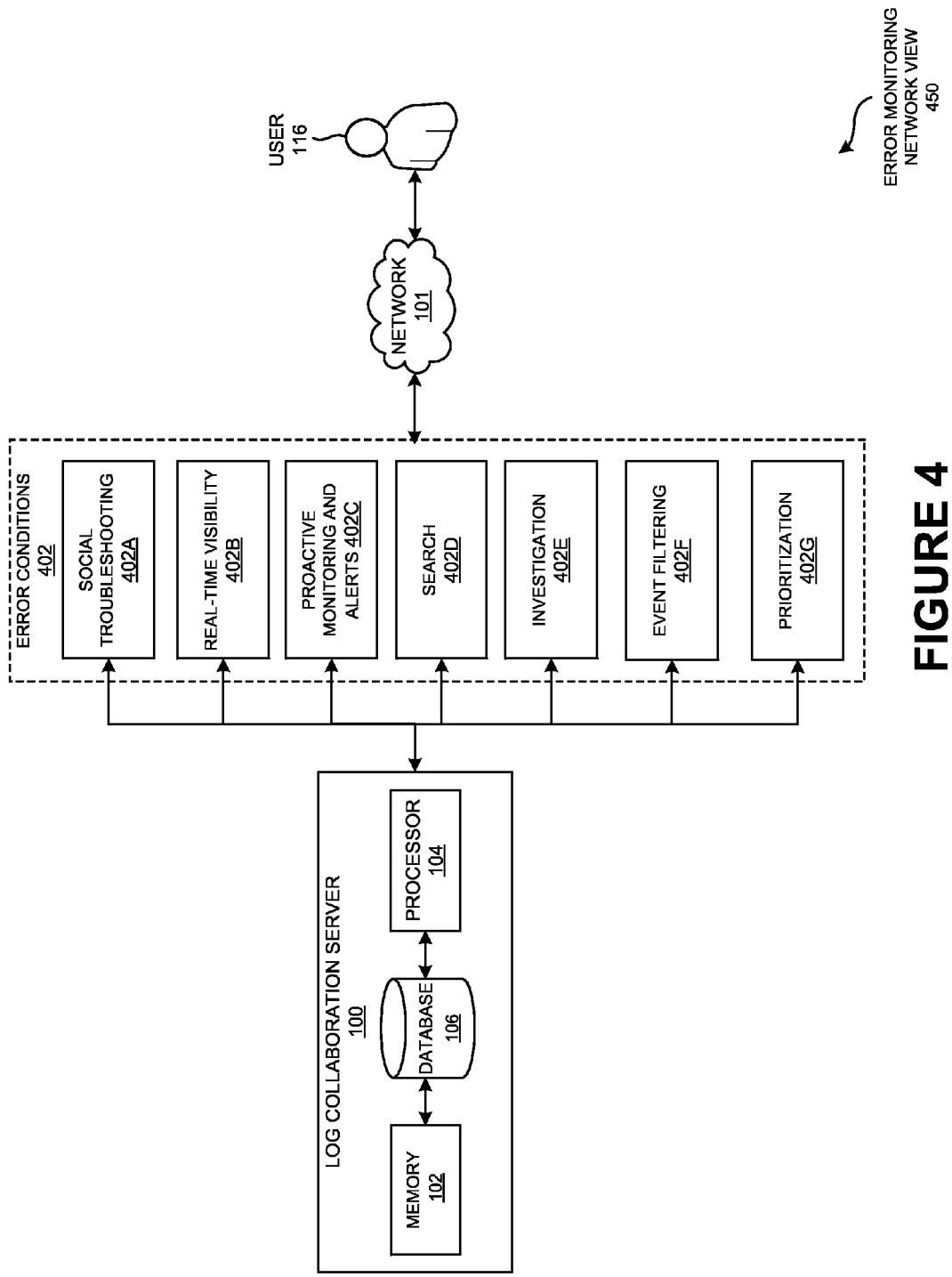
FIG. 4 is an error monitoring network view of the log collaboration server of FIG. 1, according to one embodiment.

FIG. 4 is an error monitoring network view 450 illustrating a error conditions 402, a social troubleshooting 402A, a real-time visibility 402B, a proactive monitoring and alerts 402C, a search 402D, a investigation 402E, a event filtering 402F, a prioritization 402G. The error conditions 402 may be a plurality of undesirable states of multiple things (e.g. computing code). The social troubleshooting 402A may be a community or communities of people sharing similar needs for problematic solvation. The real-time visibility 402B may be related to a system in which input data is processed within milliseconds and made optically available to others. The proactive monitoring and alerts 402C may be vigilant controlling, overseeing, and/or giving notice of something.

The search function 402D may be the ability to inquire after a piece or pieces of information by inputting keywords or characters (e.g. alphanumeric, alpha, numeric only, etc.) into a search engine (e.g. a program). The investigation function 402E may be an inspection and/or appraisal of something. The event filtering function 402F may be a piece of software that processes and removes data with prior instruction angled towards occurrences. The prioritization function 402G may be the ranking of something in a hierarchy of importance.

FIG. 4 is an error monitoring network view 450 of the log collaboration server 100 that shows possible handling of potential error conditions. In one embodiment, social troubleshooting function may include the collaboration of a plurality of users through the network 101. For example, discussion of possible solutions to the log file of importance 110 from via the social profile may occur. Real-time visibility may be provided to the users through the network to benefit their troubleshooting. A program may provide proactive monitoring and alerts of current error conditions, as well as allow the user 116 to search for various items (e.g. another log file of importance, similar error conditions, etc.). Investigation of error conditions may then be taken upon by the user and/or other users, and may include the use of event filtering.

For example, the user may have discovered a solution to a particular error, and may want to work on a plurality of log file of importance. The user may then apply an event filter to sift through various log files of importance 110 in the log collaboration server 100 relevant to him. In another embodiment urgency of error conditions may come in the form of prioritization.

Figure 5:
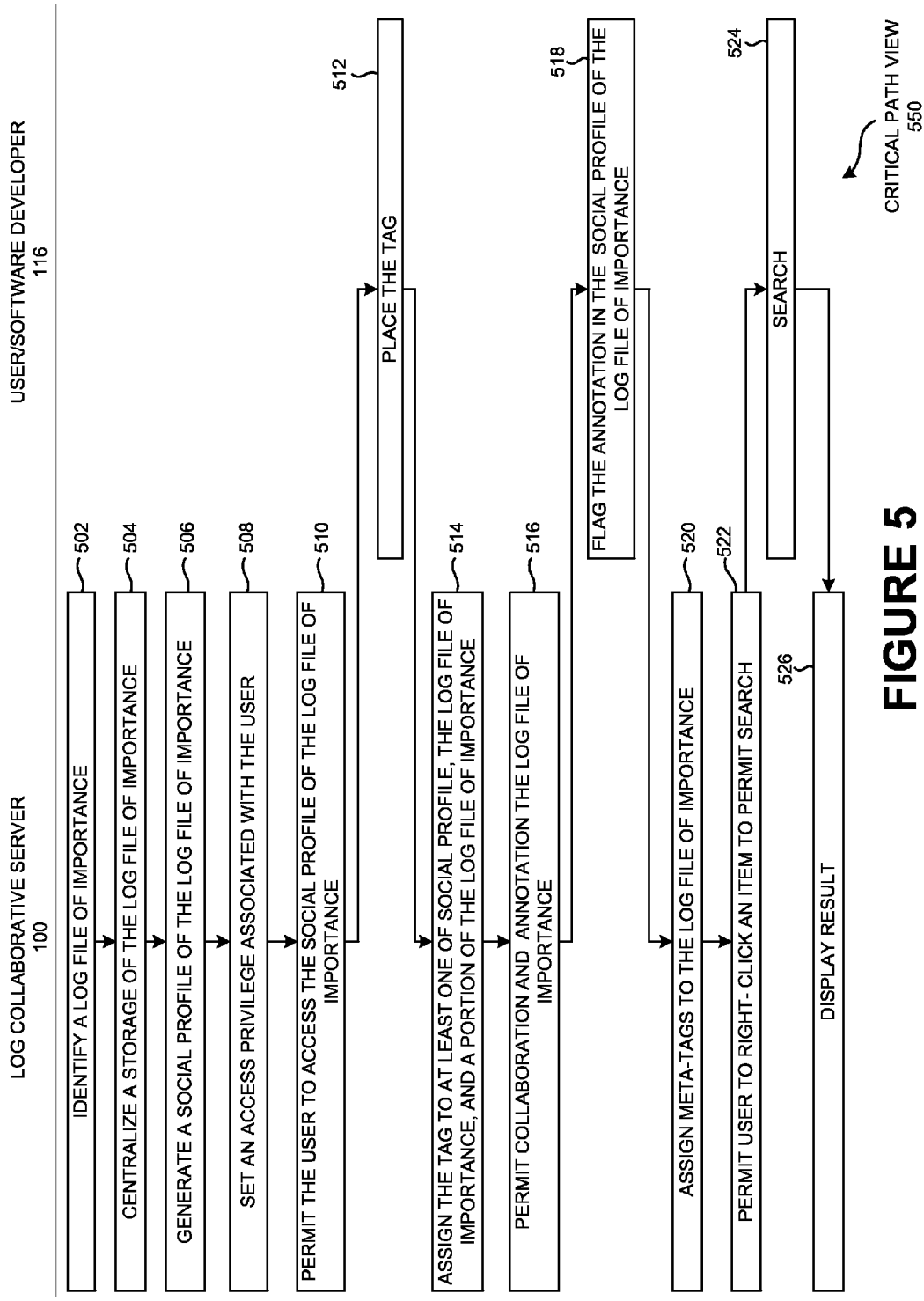
FIG. 5 is a critical path view illustrating a flow based on time in which critical operations in the log collaboration server of FIG. 1 are established, according to one embodiment.

FIG. 5 is a critical path view 550 illustrating a flow based on time in which critical operations in log collaboration server 100 of FIG. 1 are established, according to one embodiment. In operation 502, the log collaboration server 100 may identify 108 a log file of importance using a memory 102 and a processor 104. In operation 504, the log collaboration server 100 may centralize a storage of the log file of importance in a database 106.

Then, in operation 506, the log collaboration server 100 may generate a social profile 112 of the log file of importance 110 and communicate it to a plurality of users through a network. In operation 508, the log collaborative server 100 may then set an access privilege associated with a user accessing the social profile 112 of the log file of importance 110. In operation 510, the log collaborative server 100 may then permit the access the social profile 112 of the log file of importance 110 and processes a comment and an annotation in the social profile 112 of the log file of importance 119 of the user 116 accessing the social profile of the log file of importance using a processor 104 and a memory 102.

The tag is placed by the user in operation 512. Then, in operation 514, the log collaborative server 100 may then assign a tag to at least one of the social profile 112, the log file of importance, and/or a portion of the log file of importance. In operation 516 the log collaboration server 100 may then permit collaboration and/or annotation of the log file of importance, for example, by the user. In operation 518 the user then may flag the annotation in the social profile of the log file of importance, to which the log collaboration server 100, in operation 520, may assign meta-tags to the log file of importance. After which, the log collaboration server 100 may permit the user to right-click an item to permit a search, as shown in operation 522. The search may then be placed by the user in operation 524, to which the log collaboration server 100 may then display the result, as shown in operation 526.

Figure 6:
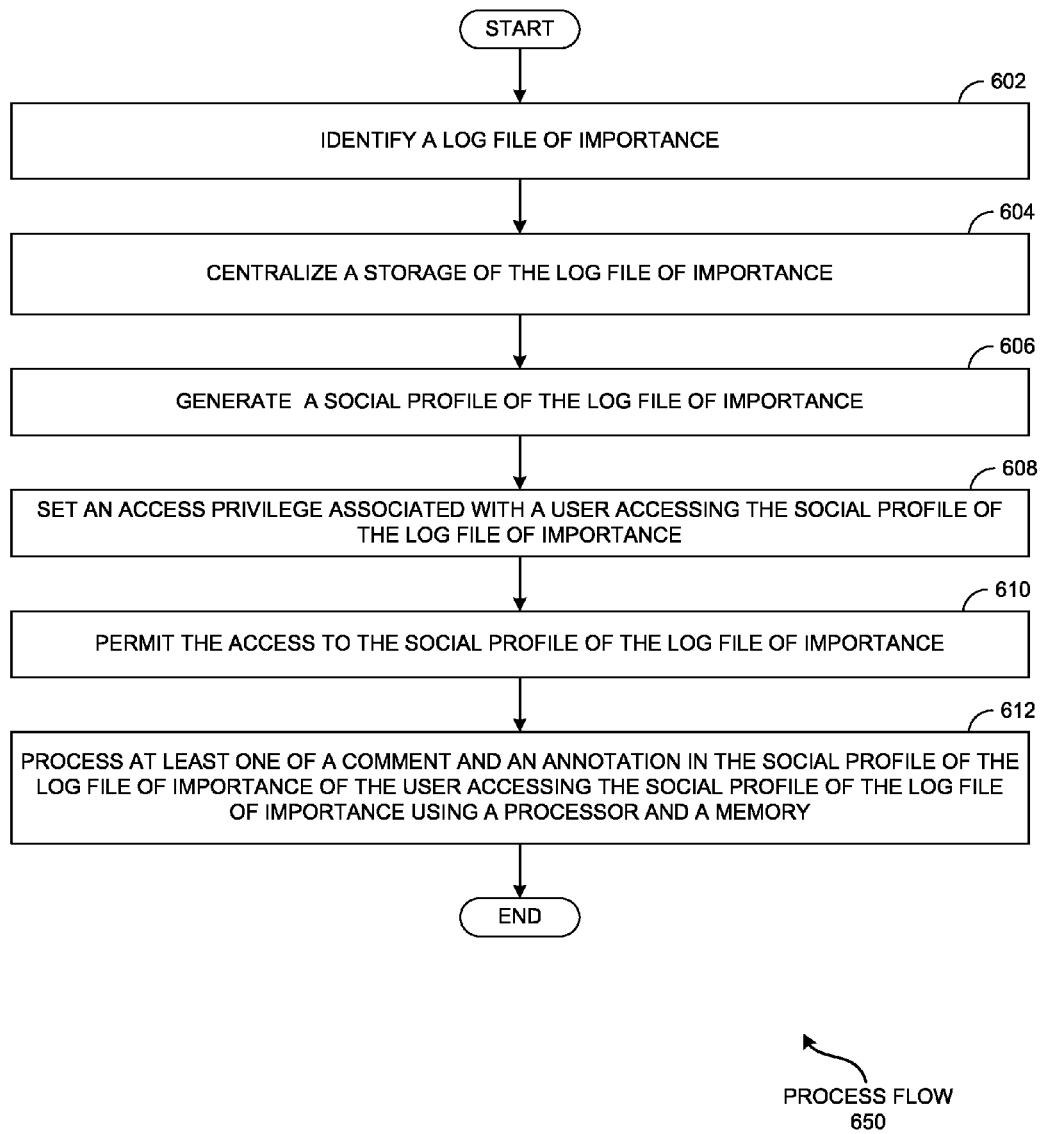
FIG. 6 is a process flow of a log collaboration of FIG. 1, according to one embodiment.

FIG. 6 is a process flow of a log collaboration of FIG. 1, according to one embodiment. In operation 602, a log collaboration server 100 includes a processor 104 and a memory 102 when executed because a computer server 100 identifies a log file of importance 110. Then, in operation 604, the server 100 centralizes storage of the log file of importance 110 and, in operation 606, generates a social profile 112 of the log file of importance 110. In operation 608, the server 100 sets an access privilege 118 associated with a user 116 accessing the social profile 112 of the log file of importance 110 and, in operation 610, permits access 120 to the social profile 112 of the log file of importance 110. In operation 612 the server 100 processes at least one of a comment 118A and an annotation 118B in the social profile 112 of the log file of importance 110 of the user 116 accessing the social profile 112 of the log file of importance 110.

A programmer Jim Davis at the Oil Production Company may need to test and debug a certain software code that is problematic, and he may do this individually or collaboratively. To avoid working on code that has already been solved in the past, or concurrently working on the same bit of code with other team members, Jim may utilize a log file to help manage code work history.

A similar coding problem may have already occurred in the past, and instead of wasting valuable time and resources working on a problem that has already been solved, Jim can use the social profile of the log file to search for similar software code over the internet and help his analysis and work. Jim can collaborate with fellow programmers further by leaving comments and annotations on the social profile of the log file. Ranking of importance and helpfulness can further help boost productivity and accuracy on the current as well as provide guidance for future problems. Leaving comments helps programmers identify what knowledge their team members possess and can help save time by knowing whom to ask for assistance.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system. Accordingly, the specification and drawings are to be regarded in an illustrative rather than a restrictive sense.

What is claimed is:

1. A method, comprising:
    identifying a log file of importance;
    centralizing a storage of the identified log file of importance for storing the identified log file in the storage;
    generating a social profile of the stored log file of importance;
    setting an access privilege associated with the generated social profile of the stored log file of importance;
    permitting a user to access the generated social profile of the stored log file of importance based on the set access privilege;
    processing, using a processor and a memory, at least one of a comment and an annotation in the accessed social profile of the stored log file of importance, wherein the processed at least one of a comment and an annotation is from the user;
    assigning, by the user, a tag to the generated social profile, wherein the assigned tag is a term that attaches to the social profile as meta-data to enable a faster relevant search based on the term;
    receiving a search request for a software code that relates to the stored log file of importance; and
    retrieving the software code, in response to the received search request, based on the assigned tag.

2. The method of claim 1 further comprising:
    determining that other users have contributed at least one of another comment and another annotation to the generated social profile of the stored log file of importance; and
    providing an update to the user when the other users contribute at least one of another comment and another annotation to the generated social profile when other users contribute comments to the stored log file of importance.

3. The method of claim 1 further comprising:
    permitting annotation of information in the generated social profile;
    determining that the stored log file of importance is associated with a debug condition that has been resolved; and
    closing future comments to the stored log file of importance when the debug condition is resolved.

4. The method of claim 1 further comprising:
    curating the stored log file of importance such that the stored log file is identified from a larger set of potential stored log files across a wider world wide web,
    wherein the method operates in a log collaboration server that permits collaboration and annotation of the stored log file of importance by users of the log collaboration server, and
    wherein the log collaboration server increases intelligence based on at least one of automatic correlation of related stored log files of importance, revision history, and semantic analysis of annotations to each stored log file of importance managed by the log collaboration server.

5. The method of claim 4 wherein the log collaboration server provides at least one of a social troubleshooting of error conditions, real-time visibility of error conditions, proactive monitoring and alerts of error conditions, search of error conditions, investigation of error conditions, event filtering of error conditions, and prioritization of error conditions.

6. The method of claim 1 further comprising:
    determining a set of access privileges associated with users to access the generated social profile of the stored log file of importance, such that the set of access privileges determine who can annotate, comment, and view the stored log file of importance.

7. The method of claim 1 further comprising:
    permitting the user to flag the annotation in the generated social profile of the stored log file of importance of the user accessing the generated social profile of the stored log file of importance.

8. The method of claim 1 further comprising:
    permitting the user to break out the stored log file of importance into separate pages of the generated social profile; and
    assigning meta-tags to the stored log file of importance so that queries are simplified to the stored log file of importance.

9. The method of claim 1 further comprising:
    aggregating the stored log file of importance from third party systems comprising at least one of a project management system, a source repository, and a distributed internet system so that it can be centralized for management;
    creating workflow management of each stored log files of importance;
    permitting the user to place a vote on annotations in the stored log file of importance which the user deems beneficial;
    ranking the annotations based on the vote and other votes of other users.

10. The method of claim 1 further comprising:
    designating an administrator to manage the stored log file of importance;

permitting the user to right-click an item to permit a search on a broader internet to permit search on a stack overflow website, and on a general purpose search engine website; and displaying a search result in a pop-up menu search result.

11. The method of claim 1 wherein productivity of a software developer is enhanced when managing logs and debugging error conditions through the annotation of the generated social profile of the stored log file of importance.

12. A non-transitory storage medium comprising instructions stored thereon executable by a processor to perform a method, comprising:
   identifying a log file of importance;
   centralizing a storage of the identified log file of importance for storing the identified log file in the storage;
   generating a social profile of the stored log file of importance;
   setting an access privilege associated with the generated social profile of the stored log file of importance;
   permitting a user to access the generated social profile of the stored log file of importance based on the set access privilege; and
   processing, using a processor and a memory, at least one of a comment and an annotation in the accessed social profile of the stored log file of importance, wherein the processed at least one of a command and an annotation is from the user;
   assigning, by the user, a tag to the generated social profile, wherein the assigned tag is a term that attaches to the generated social profile, as meta-data to enable a faster relevant search based on the term;
   receiving a search request for a software code that relates to the stored log file of importance; and
   retrieving the software code, in response to the received search request, based on the assigned tag.

13. The non-transitory storage medium of claim 12 further comprising instructions for:
   determining that other users have contributed at least one of another comment and another annotation to the generated social profile of the stored log file of importance; and
   providing an update to the user when the other users contribute at least one of another comment and another annotation to the generated social profile when other users contribute comments to the stored log file of importance.

14. The non-transitory storage medium of claim 12 further comprising instructions for:
   permitting annotation of information in the generated social profile;
   determining that the stored log file of importance is associated with a debug condition that has been resolved; and
   closing future comments to the stored log file of importance when the debug condition is resolved.

15. A log collaboration server having a processor and a memory when executed cause a computer server, to:
   identify a log file of importance;
   centralize a storage of the identified log file of importance for storing the identified log file in the storage;
   generate a social profile of the stored log file of importance;
   set an access privilege associated with the generated social profile of the stored log file of importance;
   permit a user to access the generated social profile of the stored log file of importance based on the set access privilege; and
   process, using the processor and the memory, at least one of a comment and an annotation in the accessed social profile of the stored log file of importance, wherein the processed at least one of a comment and an annotation is from the user;
   assigning, by the user, a tag to the generated social profile, wherein the assigned tag is a term that attaches to the social profile as meta-data to enable a faster relevant search based on the term;
   receive a search request for a software code that relates to the stored log file of importance; and
   retrieve the software code, in response to the received search request, based on the assigned tag.

16. The log collaboration server of claim 15 to:
   determine that other users have contributed at least one of another comment and another annotation to the generated social profile of the stored log file of importance, and provide an update to the user when the other users contribute at least one of another comment and another annotation to the generated social profile when other users contribute comments to the stored log file of importance.

17. The log collaboration server of claim 15 to:
   permit annotation of information in the generated social profile,
   determine that the stored log file of importance is associated with a debug condition that has been resolved, and
   close future comments to the stored log file of importance when the debug condition is resolved.

18. The log collaboration server of claim 15 to:
   designate an administrator to manage the stored log file of importance,
   permit the user to right-click an item to permit a search on a broader internet to permit search on a stack overflow website, and on a general purpose search engine website, and
   display a search result in a pop-up menu search result.

* * * * *